(12) United States Patent
Lee

(10) Patent No.: US 6,970,224 B2
(45) Date of Patent: *Nov. 29, 2005

(54) BIASED BENDING VERTICAL ALIGNMENT MODE LIQUID CRYSTAL DISPLAY

(75) Inventor: Seok-Lyul Lee, Taoyuan (TW)

(73) Assignee: Hannstar Display Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/912,357

(22) Filed: Aug. 5, 2004

(65) Prior Publication Data

US 2005/0007532 A1 Jan. 13, 2005

Related U.S. Application Data

(63) Continuation-in-part of application No. 10/154,711, filed on May 24, 2002, now abandoned, which is a continuation-in-part of application No. 10/020,262, filed on Dec. 13, 2001, now abandoned.

(51) Int. Cl.$^7$ .......................................... G02F 1/1343
(52) U.S. Cl. ...................... 349/144; 349/139; 349/143
(58) Field of Search ................. 349/129–130, 349/143–144, 139

(56) References Cited

U.S. PATENT DOCUMENTS

| | | | |
|---|---|---|---|
| 5,953,092 A | 9/1999 | Sung et al. | 349/143 |
| 6,323,926 B2 | 11/2001 | Watanabe et al. | 349/130 |
| 6,803,981 B2 * | 10/2004 | Lee et al. | 349/129 |
| 2003/0111697 A1 | 6/2003 | Lee | 257/393 |

* cited by examiner

*Primary Examiner*—Dung T. Nguyen
(74) *Attorney, Agent, or Firm*—Volpe and Koenig, P.C.

(57) ABSTRACT

A biased bending vertical alignment mode liquid crystal display is provided. The liquid crystal display includes a first substrate having a first electrode, a second substrate having a second electrode and a third electrodes, a plurality of first slits formed on the second electrode over the third electrodes, a plurality of second slits formed on the second electrode without covering the third electrodes, wherein the plurality of first slits and the plurality of second slits divide the second electrode into a plurality of fragmented electrode portions, and the plurality of first slits are alternate with the plurality of second slits, and a liquid crystal layer having a plurality of liquid crystal molecules and interposed between the first substrate and the second substrate.

20 Claims, 5 Drawing Sheets

BIASED BENDING VERTICAL ALIGNMENT MODE LIQUID CRYSTAL DISPLAY

RELATED APPLICATIONS

This application is a Continuation-In-Part of application Ser. No. 10/154,711, filed May 24, 2002 now abandoned, which is a Continuation-in-Part application of U.S. patent application Ser. No. 10/020,262, filed on Dec. 13, 2001 now abandoned.

FIELD OF THE INVENTION

The present invention is in relation to a liquid crystal display (LCD), and more particularly, the present invention is in relation to a biased bending vertical alignment mode liquid crystal display.

BACKGROUND OF THE INVENTION

The liquid crystal display (or LCD) is made up of two substrates and a liquid crystal layer interposed therebetween. The light is transmitted under the control of the electric field intensity applied to the liquid crystal layer.

The twisted nematic (TN) liquid crystal display, which is currently the most popular LCD, has a transparent first substrate and a transparent second substrate, a pair of transparent electrodes respectively formed on the inner surface of the transparent substrates and opposite to each other so as to drive the liquid crystal layer interposed therebetween, and a pair of polarizing plates which are respectively attached to the outer surfaces of the transparent substrates. In the off state of the LCD, that is, in the state that the electric field is not applied to the transparent electrodes, the orientations of the liquid crystal molecules are aligned perpendicular to the substrates.

Unfortunately, the contrast ratio of the conventional TN LCD in a normally black mode may not be so high because the incident light is not fully blocked in the off state. In order to obviate this problem and to increase the viewing angles of LCD, various LCD modes have been presented. An example of the new LCD mode is known as vertical alignment (VA) mode. As the name suggests, the liquid crystal molecules are normally aligned perpendicular to the inner surface of the substrates, swinging through 90° to lie parallel with substrates in the presence of electric field. This LCD mode produces a display with an ultra-wide viewing angle and high contrast ratio but with the added bonus of higher brightness and a response time of 25 milliseconds. In addition, this LCD mode also consumes less power.

Following the advent of VA mode LCD, a new technique was proposed to align the liquid crystal molecules at a sub-level which uses UV light instead of the usual rubbing. This technique involves the addition of pyramid-shaped protrusions with each of liquid crystal cell, the surface of which each makes up a separate domain, in which the liquid crystal molecules are aligned differently from those in other domains. It produces increased viewing angles, at the expense of a reduction in brightness, by ensuring that each of the multiple domains within a pixel cell channel light at an angle to the substrates, instead of at right angles to it. The result is an all-round increase in viewing angle with no variation in color tone as the viewing angle increases and, requiring no rubbing, a simplified manufacturing process with a reduction in the possibility of liquid crystal contamination. When combined with the VA mode, the resultant display is known as a multi-domain vertical alignment (MVA) mode LCD and produces a viewing angle of 160° in all directions with a high contrast ratio of around 300:1.

However, the pyramid-shaped protrusions which are applied to control the tilt direction of the liquid crystal molecules are the major reasons for the low yield and high cost of the LCD products. There is an inclination to develop an active matrix LCD which has an improved response time, an increased viewing angle, an enhanced yield and a lower cost.

SUMMARY OF THE INVENTION

The foregoing objectives can be attained by providing a liquid crystal display. The liquid crystal display includes a first substrate having a first electrode, a second substrate having a second electrode and a third electrode, a plurality of first slits formed on the second electrode over the third electrodes, a plurality of second slits formed on the second electrode without covering the third electrodes, wherein the plurality of first slits and the plurality of second slits divide the second electrode into a plurality of fragmented electrode portions, and the plurality of first slits are alternate with the plurality of second slits, and a liquid crystal layer having a plurality of liquid crystal molecules and interposed between the first substrate and the second substrate. The orientations of the respective liquid crystal molecules positioned out of vicinity above the second slit are respectively aligned from a first angle to a second angle with respect to surfaces of the first substrate and the second substrate while there are a first-level and a second-level electric fields respectively across the liquid crystal layer.

Certainly, orientations of the liquid crystal molecules in vicinity above the first slit are aligned parallel to the second substrate.

Preferably, the first angle respecting to the second substrate is ranged from 70 to 90 degrees.

Preferably, the first-level electric field is a zero electric field.

Preferably, the second angle respecting to the second substrate is ranged from 0 to 45 degrees.

Preferably, the liquid crystal molecules have a negative dielectric anisotropy.

Preferably, the liquid crystal display further includes a spacer for producing a gap between the first substrate and the second substrate.

Preferably, the liquid crystal display further includes an analyzer attached on an outer surface of the first substrate.

Preferably, the first electrode is a common electrode.

Preferably, the second electrode is a pixel electrode.

Preferably, the liquid crystal display further includes a polarizer attached on an outer surface of the second substrate.

Preferably, the liquid crystal display further includes a plurality of gate lines and a plurality of data lines crossed with each other.

Preferably, the liquid crystal display further includes a plurality of switching elements located at intersections of gate lines and data lines.

Preferably, the third electrode is connected to one of the gate lines.

Preferably, the third electrode is an independent electrode.

Preferably, the liquid crystal display further includes a passivation layer disposed between the second electrode and the third electrode.

Preferably, the second electrode is divided into a plurality of fragmented electrode portions by the first slit and the second slit.

Preferably, the first-level electric field and the second-level electric are controlled by means of adjusting relative potential between the first electrode and the second electrode.

Preferably, the first electrode and the second electrode are connected to a common voltage and a various voltage respectively.

Preferably, the first electrode and the second electrode are formed of a transparent conductive material.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
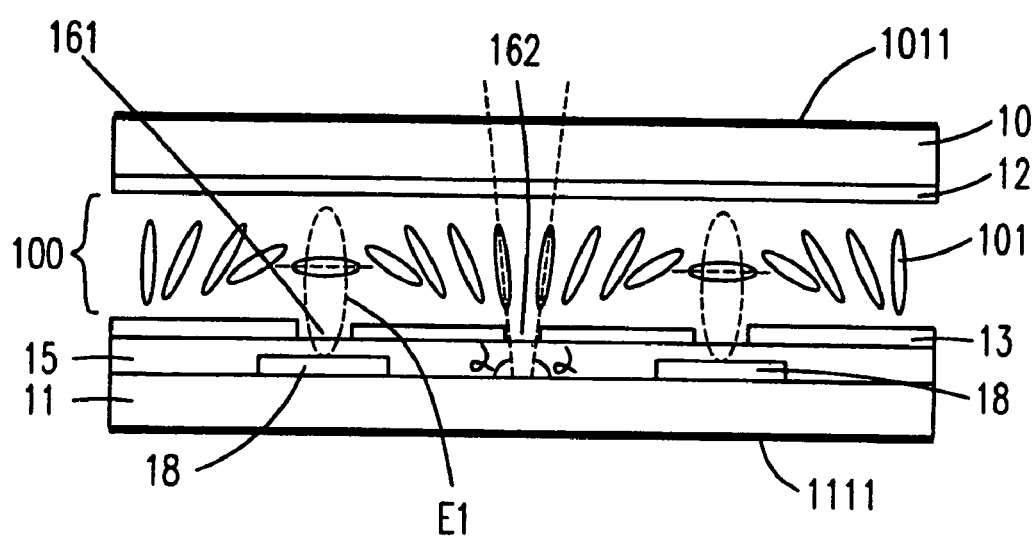
FIG. 1 shows the structure of electrodes and the alignment of the liquid crystal molecules of LCD in the dark state in accordance with the present invention.
Figure 2:
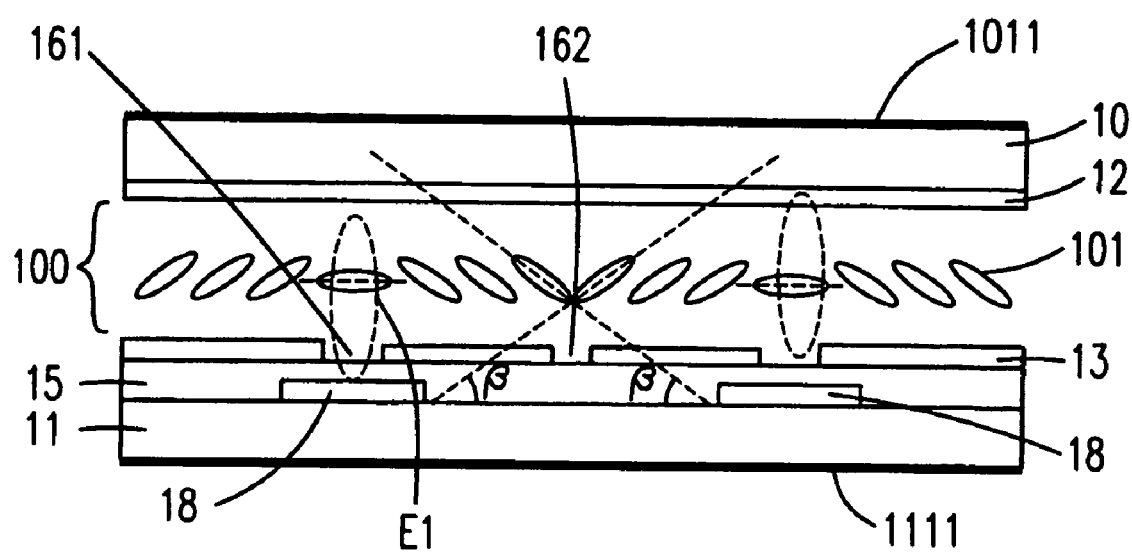
FIG. 2 shows the structure of electrodes and the alignment of the liquid crystal molecules of LCD in the white state in accordance with the present invention.

FIG. 1 shows the structure of electrodes and the alignment of the liquid crystal molecules of the LCD in the dark state in accordance with the present invention, and FIG. 2 shows the structure of electrodes and the alignment of the liquid crystal molecules of the LCD in the white state in accordance with the present invention. As indicated in FIG. 1 and FIG. 2, a first substrate 10 and a second substrate 11 made of a transparent insulating material such as glass are spaced apart from each other. Two transparent electrodes 12 and 13 made of a transparent conductive material such as ITO (Indium-Tin-Oxide) are formed respectively on the inner surface of the glass substrates 10 and 11. A liquid crystal layer 100 including the liquid crystal molecules 101 having a negative dielectric anisotropy is disposed between the first substrate 10 and the second substrate 11. On the outer surface of the substrates 10 and 11, a polarizer 1011 (or analyzer) and a polarizer 1111 are respectively attached to the outer surface of the first substrate 10 and the outer surface of the second substrate 11. The polarizer polarizes the light beam incident on the liquid crystal layer 100 and the light beam out of the liquid crystal layer 100 respectively. The polarizing directions of the analyzer 1011 and the polarizer 1111 are perpendicular to each other. A light source or a back light is disposed on the rear of the LCD to act as an optical shutter (not shown). On the other hand, the first substrate 10 is further provided with a color filter (not shown).

Please refer to FIGS. 1–4. As shown in FIG. 1 and FIG. 2, the liquid crystal display embodying the present invention is constructed with a first substrate 10 and a second substrate 11, and a liquid crystal layer 100 disposed between the first substrate 10 and the second substrate 11. A first electrode 12 (or common electrode) is provided to cover the entire surface of the first substrate 10 and a second electrode 13 (or pixel electrode) is provided on the inner surface of the second substrate 11. In accordance with a preferred embodiment of the present invention, the pixel region of LCD is constituted by a matrix consisting of a plurality of scanning lines 14 (or gate lines) and a plurality of signal lines 17 (or data lines) and both of them are arranged in a crossover form. Both the gate lines 14 (FIG. 3) and the data lines 17 (FIG. 3) are part of a switching element such as a thin film transistor 30 (TFT), which is formed on the second substrate 11 and connected to the second electrode 13. The first slits 161 are created at the second electrode 13, on a passivation layer 15 and covering the center of a third electrode 18 covered by the passivation layer 15, while the second slits 162 are created at the second electrode 13, on the passivation layer 15 but without covering the third electrode 18. When the first slits 161 and the second slits 162 are created at the second electrodes 13, the second electrode 13 is divided into a plurality of fragmented electrode portions. In addition, generally, the first slits 161 are alternate with the second slits 162. The same signal voltage must be applied to fragmented electrode portions, and an electric connection must be established to interconnect these fragmented electrode portions.

FIG. 1 shows the dark state that a first-level electric field E1 is applied to the liquid crystal layer 100. The second electrode 13 having the first slits 161 formed on the passivation layer 15 and covering the third electrodes 18 which are provided over the matrix consisting of the gate lines 14 and the orthogonal data lines 17. The liquid crystal molecules 101 in the vicinity of the second slits 162 are aligned a first angle α that is mostly perpendicular to the inner surface of the second substrate 11 while applying the first-level electric field E1. However, the liquid crystal molecules 101 in the vicinity of the first slits 161 in the liquid crystal layer 100 are aligned parallel to the inner surface of the first substrate 10 or the second substrate 11. The polarized light generated by the polarizer 1111 passes through the portion of the liquid crystal layer 100 where the liquid crystal molecules are aligned parallel with respect to the first substrate 10 or the second substrate 11, so as to make a dark state.

As discussed above, in the absence of electric field, i.e. there is no voltage difference between the first electrode 12 and the second electrode 13, the liquid crystal molecules 101 are aligned perpendicular to the inner surface of the substrates 10 and 11. However, the liquid crystal molecules 101 in the vicinity of first slits 161 are aligned parallel to the inner surface of the substrates 10 and 11, wherein the first slits 161 are located at the second electrode 13, on the passivation layer 15, and cover the third electrodes 18. Because the voltage difference between the third electrodes 18 and the first electrode 12 is maintained high enough to keep the oblique liquid crystal molecules 101 parallel to the inner surface of the substrates 10 and 11, the electric field applied to the liquid crystal layer 100 can determine the direction in which the liquid crystal molecules 101 are tilted. The orientation of the liquid crystal molecules 101 is divided into different directions along a plane defined by each pair of fragmented electrode portions over the third electrode 18.

FIG. 2 shows the white state that the sufficient electric field is applied to the liquid crystal layer 100 by the first electrode 12 and the second electrode 13, in which the liquid crystal molecules 101 in the liquid crystal layer 100 are tilted, and the direction of the liquid crystal layer 100 varies continuously. The polarized light generated by the polarizer passes through the liquid crystal layer 100 and its polarization is rotated by 90° in accordance with the variation of direction of the liquid crystal layer 100. In addition, when the electric field is applied to the liquid crystal layer 100, the orientations of the respective liquid crystal molecules 101 positioned in vicinity above the second slits 162 are respectively aligned from a first angle to a second angle with respect to surfaces of the first substrate 10 and the second substrate 11. Preferably, the first angle and the second angle are ranged from 70 to 90 degrees and from 0 to 45 degrees respectively. In this way, the light passes through the analyzer 1011 will achieve a white state. It can be seen from FIG. 2 that if a predetermined voltage difference is applied to the first electrode 12 and the fragmented electrode portions 13, most of the liquid crystal molecules 101 will easily and rapidly align parallel to the inner surface of the substrates 10 and 11, and a white display will appear.

Preferably, the second slits 162 provide a function of forcing the liquid crystal molecules 101 positioned in vicinity above the second slits 162 to be tilted towards a certain direction. Originally, when a second slits 162 is not provided, the liquid crystal molecules 101 positioned out of the vicinity between every two of the first slits 161 are tilted when a sufficient electric field is applied. However, the liquid crystal molecules 101 which are positioned out of the vicinity between every two of the first slits 161, are often affected by plural different forces simultaneously, which results in several possible tilted directions for the liquid crystal molecules 101. Meanwhile, the response time for the liquid crystal molecules 10 to respond the altered electric field and being tilted are unavoidably delayed because of the plural different forces. Therefore, the second slits 162 between two first slits 161 are further provided in the present invention in order to provide a stronger force. Accordingly, while the applied electric field is altered, the liquid crystal molecules 101 positioned in vicinity above the second slits 162 will be tilted to a certain direction without time delay.

Figure 3:
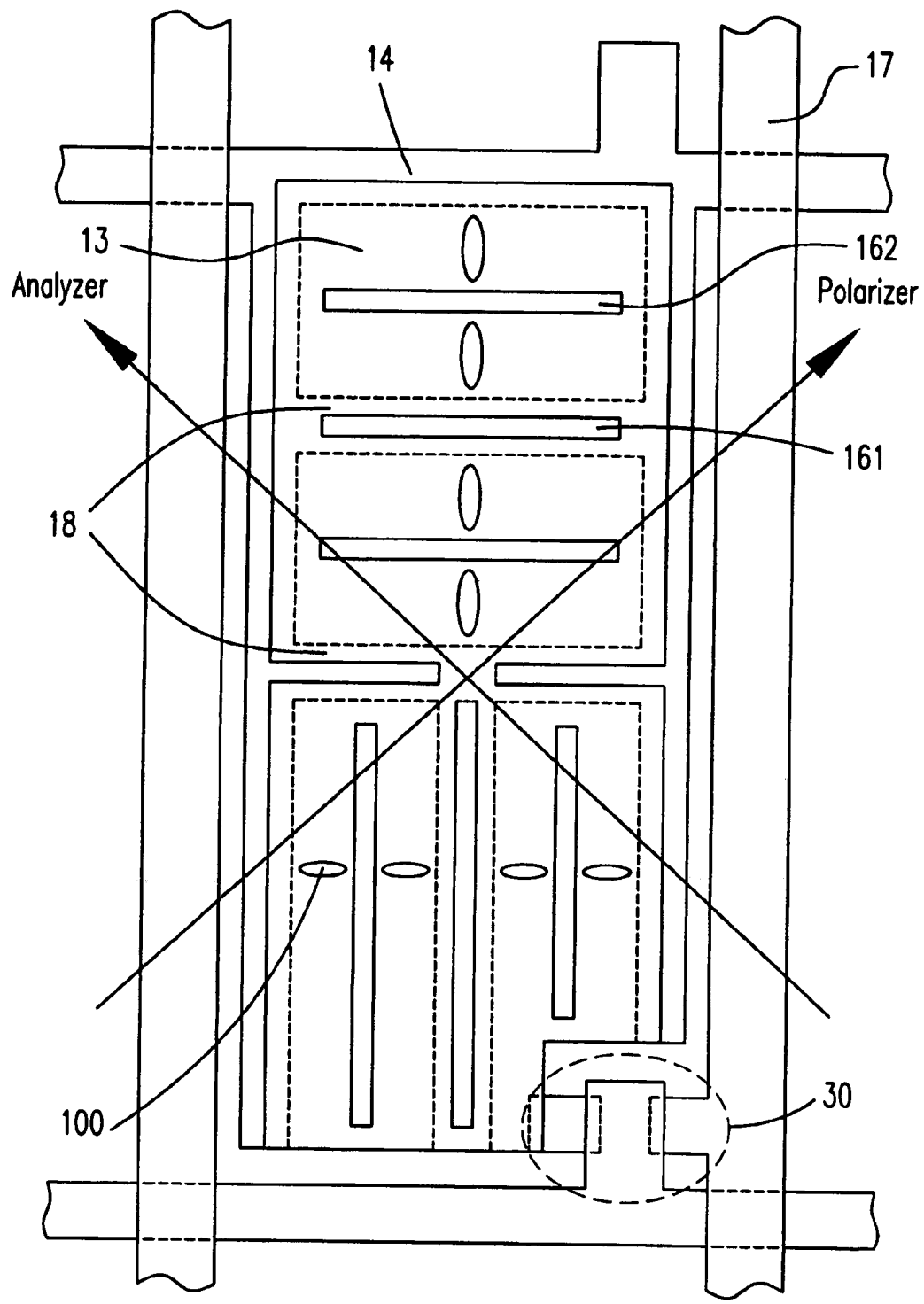
FIG. 3 is a plan view showing the pixel region of LCD according to a preferred embodiment of the present invention.

FIG. 3 shows the pixel region of LCD according to a preferred embodiment of the present invention. As shown in FIG. 3, the gate lines 14 are extended horizontally or transversely and crisscross arranged with the data lines 17 to from a matrix of pixels. A plurality of thin film transistor 30 used as switching elements are provided and located at intersections of the gate lines 14 and the data lines 17. The second electrodes 13 are provided in matrix and each connected to the TFT. A plurality of first slits 161 are provided on the second electrodes 13 to divide the second electrodes 13 into a plurality of fragment electrode portions. The third electrode 18 is connected to the gate electrode 340. A spacer (not shown) is provided between the first substrate 10 and the second substrate 11 to produce a gap. A liquid crystal material having a negative dielectric anisotropy is injected into the gap through an injection port (not shown) between the substrates to form a liquid crystal layer 100. Further, the liquid crystal layer 100 also can be formed by an ODF (one drop fill) method. Subsequently the injection port is sealed, and a pair of polarizing plates is attached to their respective substrates to finish the production of a LCD.

Figure 4:
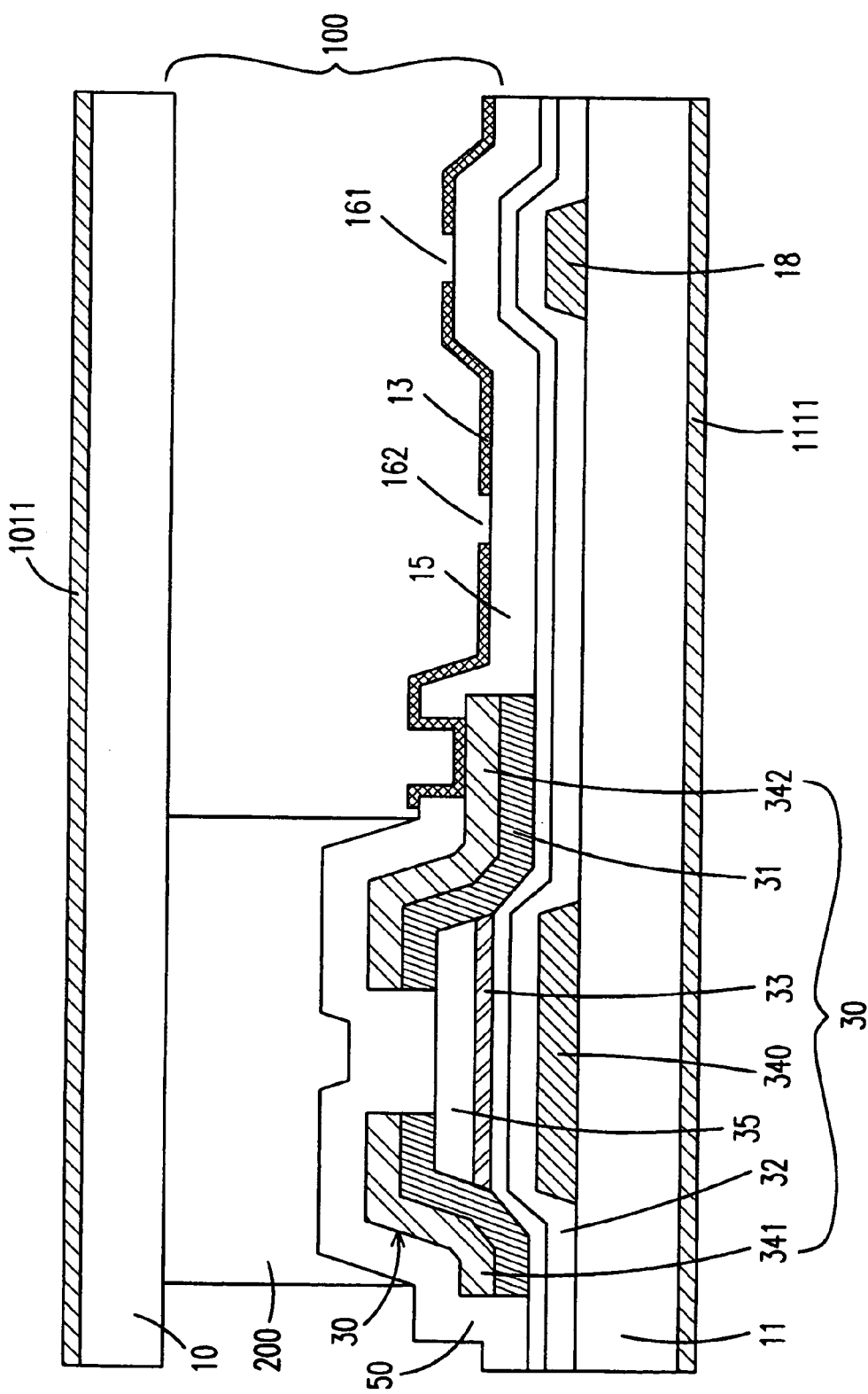
FIG. 4 shows a cross-sectional view of LCD according to a preferred embodiment of the present invention.

FIG. 4 shows a cross-sectional view of the LCD according to a preferred embodiment of the present invention. As shown in FIG. 4, a spacer 200 formed of a metal or an organic material is formed on the TFT 30 to produce a gap between the first substrate 10 and the second substrate 11. A liquid crystal layer 100 is disposed between the second substrate 11 having a TFT 30 and the first substrate 10 having a color filter (not shown).

The TFT 30 formed on the second substrate 11 includes a gate electrode 340 formed on the second substrate 11, a gate insulating layer 32 formed on the gate electrode 340 and the second substrate 11, an a-Si semiconductor layer 33 formed on the gate insulating layer 32 and over the gate electrode 340, an etching stop layer 35 formed on the a-Si semiconductor layer 33 and over the gate electrode 340, an ohmic contact layer 31 formed on the etching stop layer 35, the a-Si semiconductor layer 33 and the gate insulating layer 32, and a source electrode 341 and a drain electrodes 342 both formed on the ohmic contact layer 31.

A passivation layer 15 covers the entire surface of second substrate 11 and is located on the surface of the gate insulating layer 32, the etching stop layer 35, the source electrode 341 and the drain electrodes 342. A second electrode 13 is formed in the pixel region and electrically coupled to the drain region 342 through a contact hole in the passivation layer 15. The first slits 161 are created at the second electrodes 13, on the passivation layer 15 and covering the third electrodes 18, while the second slits 162 are created at the second electrodes 13, on the passivation layer 15 but without covering the third electrodes 18, wherein the first slits 161 and the second slits 162 divide the second electrodes 13 into a plurality of fragmented electrode portions.

Figure 5:
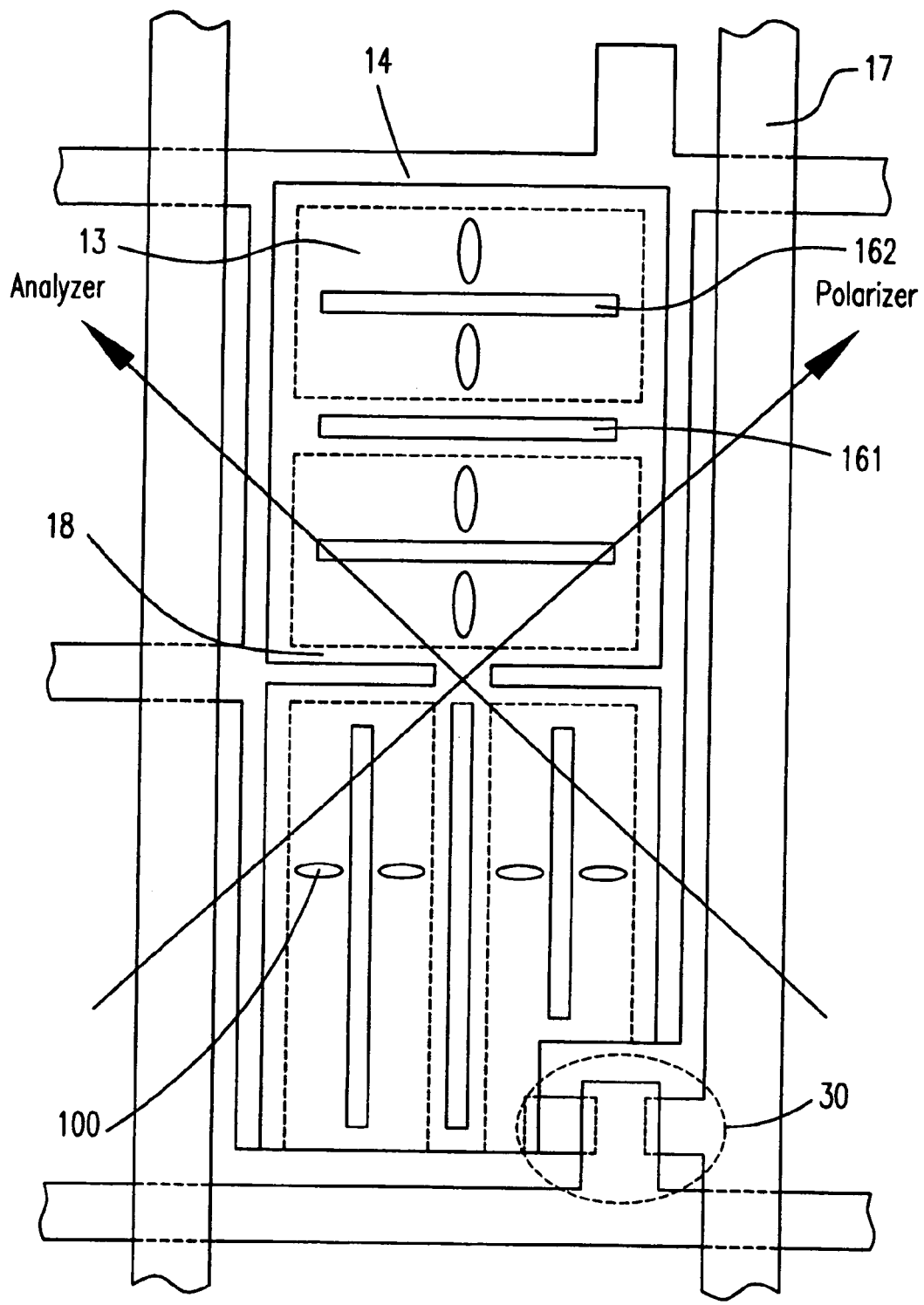
FIG. 5 is a plan view showing the pixel region of LCD according to another preferred embodiment of the present invention.

FIG. 5 shows the pixel region of LCD according to another preferred embodiment of the present invention. As shown in FIG. 5, the gate lines 14 are extended horizontally or transversely and crisscross arranged with the data lines 17 to from a matrix of pixels. A thin film transistor 30 as a switching element is provided at the intersection of the gate lines 14 and the data lines 17. The second electrodes 13 are provided in matrix and each connected to the TFT. The first slits 161 covering the third electrodes 18 are provided at the second electrodes 13, while the second slits 162 are provided at the second electrodes 13 but without covering the third electrodes 18, wherein the first slits 161 and the second slits 162 divide the second electrodes 13 into a plurality of fragment electrode portions. In FIG. 3, the third electrode 18 is connected to the gate electrode 340, but the third electrodes 18 in FIG. 5 are independent electrodes and not connected to the gate lines 14. The various cases of bias voltage pairs according to FIG. 5 of the present invention could optimize LC tilt angle in surround slit ITO over the third electrode.

As described above, the orientations of the liquid crystal molecules of the LCD according to the present invention is determined by the electric field intensity across the liquid crystal layer. By way of dividing the pixel electrode on the second substrate into a plurality of fragmented electrode portions so as to create the first slits 161 over the third electrode and the second slits 162, the dark state and the white state of the LCD can be readily and easily achieved by controlling the orientations of the liquid crystal molecules through the electric field across the fragmented electrode portions and the common electrode. In comparison with the prior MVA technology, the present invention substantially removes the protrusions on the first substrate, and the liquid crystal alignment method of the liquid crystal display can be accomplished by appropriately applying electric field across the common electrode and fragmented pixel electrodes overlapping the third electrode to make the dark state and the white state. Owing to the removal of the protrusions, it is known that the present invention is advantageous in terms of response time, viewing angle, yield and manufacturing cost.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display comprising:
   a first substrate having a first electrode;
   a second substrate having a second electrode, a third electrode below the second electrode, wherein the second electrode having a first slit covering the third electrode and a second slit without covering the third electrode; and
   a liquid crystal layer disposed between the first substrate and the second substrate, and having a plurality of liquid crystal molecules,
   wherein orientations of the liquid crystal molecules in vicinity above the second slit are aligned from a first angle to a second angle respecting to the second substrate while applying a first-level electric field and a second-level electric field respectively across the liquid crystal layer.

2. The liquid crystal display according to claim 1, wherein orientations of the liquid crystal molecules in vicinity above the first slit are aligned parallel to the second substrate.

3. The liquid crystal display according to claim 1, wherein the first angle respecting to the second substrate is ranged from 70 to 90 degrees.

4. The liquid crystal display according to claim 1, wherein the first-level electric field is a zero electric field.

5. The liquid crystal display according to claim 1, wherein the second angle respecting to the second substrate is ranged from 0 to 45 degrees.

6. The liquid crystal display according to claim 1, wherein the liquid crystal molecules have a negative dielectric anisotropy.

7. The liquid crystal display according to claim 1, further comprises a spacer for producing a gap between the first substrate and the second substrate.

8. The liquid crystal display according to claim 1, further comprises an analyzer attached on an outer surface of the first substrate.

9. The liquid crystal display according to claim 1, wherein the first electrode is a common electrode.

10. The liquid crystal display according to claim 1, wherein the second electrode is a pixel electrode.

11. The liquid crystal display according to claim 1, further comprises a polarizer attached on an outer surface of the second substrate.

12. The liquid crystal display according to claim 1, further comprises a plurality of gate lines and a plurality of data lines crossed with each other.

13. The liquid crystal display according to claim 12, further comprises a plurality of switching elements located at intersections of gate lines and data lines.

14. The liquid crystal display according to claim 13, wherein the third electrode is connected to one of the gate lines.

15. The liquid crystal display according to claim 1, wherein the third electrode is an independent electrode.

16. The liquid crystal display according to claim 1, further comprises a passivation layer disposed between the second electrode and the third electrode.

17. The liquid crystal display according to claim 1, wherein the second electrode is divided into a plurality of fragmented electrode portions by the first slit and the second slit.

18. The liquid crystal display according to claim 1, wherein the first-level electric field and the second-level electric are controlled by means of adjusting relative potential between the first electrode and the second electrode.

19. The liquid crystal display according to claim 18, wherein the first electrode and the second electrode are connected to a common voltage and a various voltage respectively.

20. The liquid crystal display according to claim 1, wherein the first electrode and the second electrode are formed of a transparent conductive material.

* * * * *